Figure 7E:
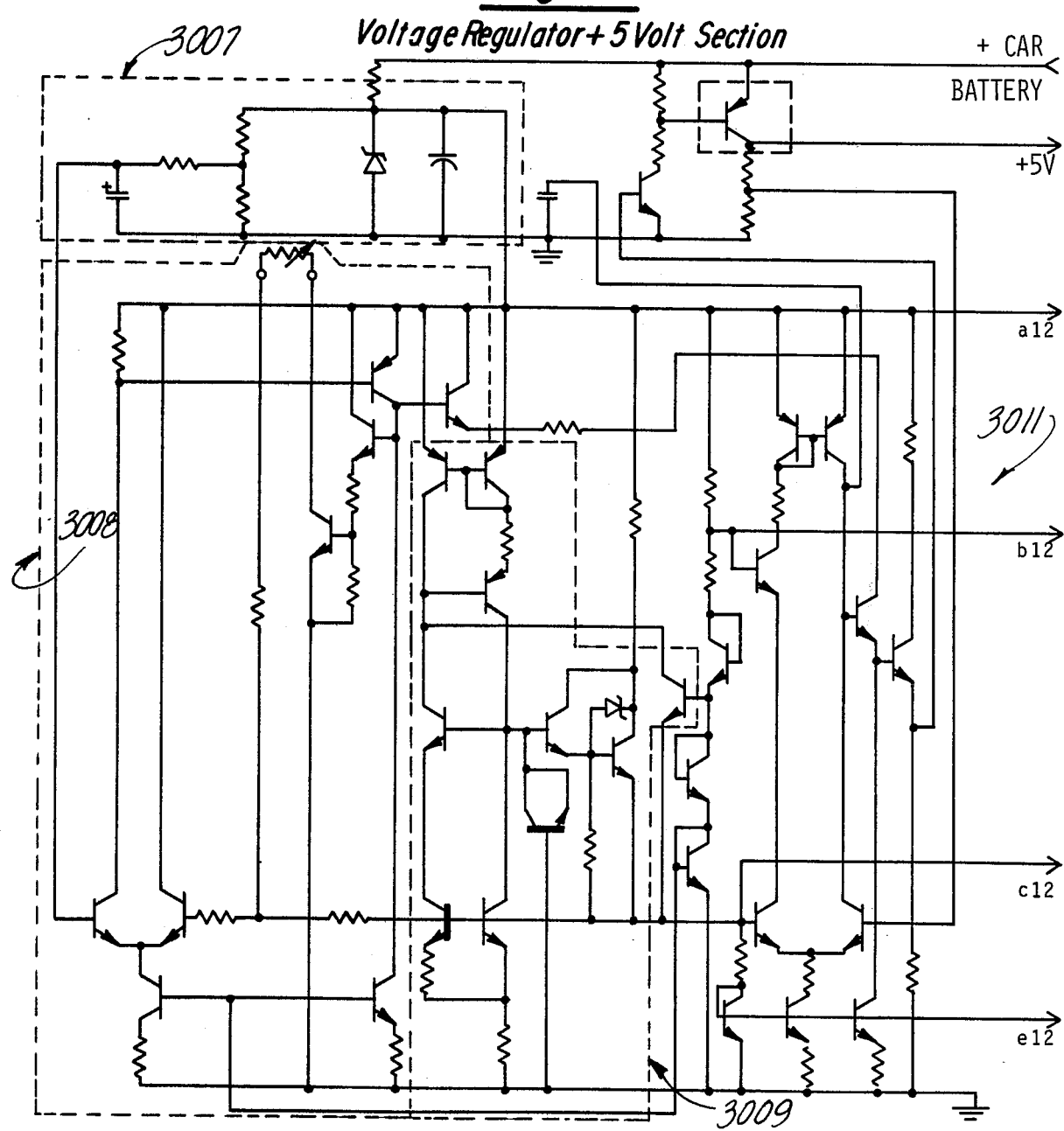

United States Patent [19]

Weber et al.

[11] 4,244,050
[45] Jan. 6, 1981

[54] DUAL VOLTAGE REGULATOR WITH LOW VOLTAGE SHUTDOWN

[75] Inventors: Robert E. Weber; Harold E. Weissler, II, both of Newport News, Va.

[73] Assignee: The Bendix Corporation, Southfield, Mich.

[21] Appl. No.: 881,921

[22] Filed: Feb. 27, 1978

[51] Int. Cl.³ .................. G05F 1/38; G01R 19/165
[52] U.S. Cl. .................. 371/66; 340/636; 340/663; 361/18; 364/431
[58] Field of Search .......... 364/426, 431; 340/636, 340/663; 361/18, 92; 324/133; 371/66

[56] References Cited

U.S. PATENT DOCUMENTS

| | | | |
|---|---|---|---|
| 3,079,543 | 2/1963 | Decker | 361/92 X |
| 3,405,319 | 10/1968 | Barringer | 361/92 X |
| 3,670,246 | 6/1972 | Gately | 324/133 |
| 3,679,965 | 7/1972 | Wilkinson | 340/663 X |
| 3,784,846 | 1/1974 | Krick et al. | 361/92 X |
| 3,792,341 | 2/1974 | Kime, Jr. | 361/92 X |
| 3,918,043 | 11/1975 | Beck | 340/663 |
| 4,005,344 | 1/1977 | Gaind et al. | 361/92 |

Primary Examiner—Felix D. Gruber
Attorney, Agent, or Firm—Gaylord P. Haas, Jr.; Russel C. Wells

[57] ABSTRACT

A method and apparatus for controlling the various functions of an internal combustion engine using a program-controlled microprocessor having a memory preprogrammed with various control laws and associated control schedules receives information concerning one or more engine-operating parameters such as manifold pressure, throttle position, engine coolant temperature, air temperature, engine speed or period and the like. These parameters are sensed and then supplied to input circuits for signal conditioning and conversion into digital words usable by the microprocessor. The microprocessor system computes a digital word indicative of a computer-commanded engine control operation and output circuitry responds to predetermined computer-generated commands and to the computed digital command words for converting them to corresponding pulse-width control signals for controlling such engine operations as fuel-injection, ignition timing, proportional and/or on-off EGR control, and the like.

2 Claims, 2 Drawing Figures

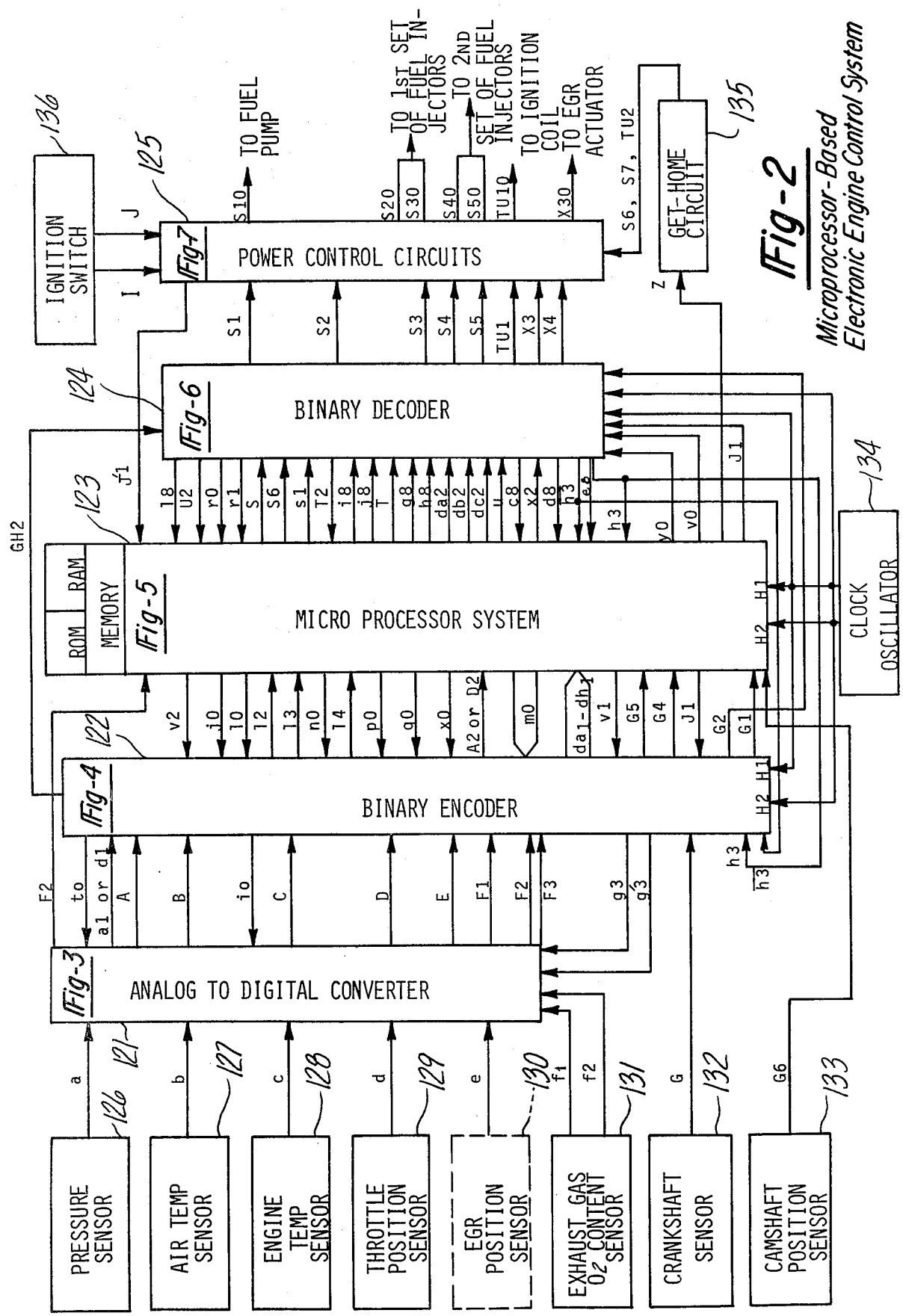

Voltage Regulator + 5 Volt Section

DUAL VOLTAGE REGULATOR WITH LOW VOLTAGE SHUTDOWN

BACKGROUND OF THE INVENTION

1. Field of the Invention

This invention relates generally to a method and apparatus for controlling an internal combustion engine and more particularly to a microprocessor-based electronic engine control system having a memory preprogrammed with various control laws and control schedules responsive to one or more sensed engine-operating parameters and generating signals for controlling fuel injection, ignition timing, EGR control, and the like.

2. Statement Of The Prior Art

Many of the patents of the prior art recognize the need for employing the enhanced accuracy of digital control systems for more accurately controlling one or more functions of an internal combustion engine.

U.S. Pat. No. 3,969,614 which issued to David F. Moyer, et al on July 13, 1976 is typical of such systems as are U.S. Pat. No. 3,835,819 which issued to Robert L. Anderson, Jr. on Sept. 17, 1974; U.S. Pat. No. 3,904,856 which issued to Louis Monptit on Sept. 9, 1975; and U.S. Pat. No. 3,906,207 which issued to Jean-Pierre Rivere, et al on Sept. 16, 1975. All of these Patents represent a break-away from the purely analog control systems of the past, but neither the accuracy, reliability, or number of functions controlled is sufficient to meet present day requirements.

Future internal combustion engines will require that emissions be tightly controlled due to ever-increasing governmental regulations, while fuel consumption is minimized and drivability improved over the entire operating range of the engine. None of the systems of the prior art provide a method and apparatus for controlling the operation of an internal combustion engine over any substantial portion of its operating range with sufficient accuracy to attain minimal emissions and minimal fuel consumption while simultaneously achieving improved drivability.

The systems of the prior art attempt to control one or more of the engine-operating functions but none attempts to control the operation of the fuel pump, fuel injection, engine ignition timing, on-off and/or proportional EGR control, and the like while using feedback from such devices as oxygen sensors for emission control purposes or for effecting a closed loop fuel control mode of operation, while further including provisions for optimizing acceleration enrichment handling, and the like. Moreover, the systems of the prior art are extremely expensive, difficult to repair and maintain and are not commercially feasible at the present time.

These and other problems of the prior art are solved by the microprocessor-based electronic engine control system of the present invention which eliminates most or all of the problems of the prior arts and enables a commercially feasible implementation of a digital control system having a relatively low cost, and which is easy to repair and maintain. The system of the present invention is able to implement much more advanced and complex fuel control laws and expand the various control functions performed thereby to include ignition timing and on-off and/or proportional EGR control while, at the same time, reducing the cost and size of the unit and increasing reliability so as to render the system commercially feasible.

These and other objects and advantages of the present invention will be accomplished by the present method and apparatus for the electronic engine control of nearly all engine functions while simultaneously providing many safety features together with increased accuracy and ease of adaption to internal combustion engines of modern vehicles.

SUMMARY OF THE INVENTION

The present invention includes dual voltage regulator means for generating both a +5 volt and a +9.5 volt supply voltage and includes a series pass transistor means for achieving low input to output offset. The dual voltage regulator of the present invention includes an adjustable input which sets the supply line voltage below which the regulator automatically shuts down for preventing the erroneous operation of the microprocessor-based electronic engine control system at low supply voltages. The voltage regulator means of the present invention simultaneously provides (1) a low voltage drop across the series pass element; (2) means for selectively adjusting the output voltage of the regulator; and (3) means for independently and selectively adjusting the low voltage automatic shut-down threshhold level.

This application is one of fourteen applications filed on Feb. 27, 1978, all commonly assigned and having substantially the same specification and drawings, the fourteen applications being identified below:

| Serial Number | Title |
| --- | --- |
| 881,321 | Microprocessor-Based Electronic Engine Control System |
| 881,322 | Feedback-Compensated Ramp-Type Analog to Digital Converter |
| 881,323 | Input/Output Electronic For Microprocessor-Based Engine Control System |
| 881,324 | Switching Control of Solenoid Current in Fuel Injection Systems |
| 881,921 | Dual Voltage Regulator With Low Voltage Shutdown |
| 881,922 | Oxygen Sensor Qualifier |
| 881,923 | Ratiometric Self-Correcting Single Ramp Analog To Pulse Width Modulator |
| 881,924 | Microprocessor-Based Engine Control System Acceleration Enrichment Control |
| 881,925 | Improvements in Microprocessor-Based Engine Control Systems |
| 881,981 | Oxygen Sensor Feedback Loop Digital Electronic Signal Integrator for Internal Combustion Engine Control |
| 881,982 | Improvements in Electronic Engine Controls System |
| 881,983 | Electronic Fuel Injection Compensation |
| 881,984 | Ignition Limp Home Circuit For Electronic Engine Control Systems |
| 881,985 | Oxygen Sensor Signal Conditioner |

Application Ser. No. 881,321 has been printed in its entirety and the specification of that application is specifically incorporated herein by reference.

We claim:

1. A voltage regulator for use in controlling the supply voltage to a microprocessor-based electronic engine control system responsive to one or more sensed engine-operating parameters for generating engine control commands, said voltage regulator comprising series pass transistor means for achieving a low input to output offset, adjustable input means for establishing a predetermined threshhold level of supply line voltage below which said regulator shuts down, and means for automatically shutting down said regulator when said supply line voltage drops below said predetermined threshhold level for preventing the erroneous operation of said electronic engine control system at low supply voltages.

2. The voltage regulator of claim 1 further including means for selectively varying the level of output voltage being regulated.

* * * * *